Jan. 7, 1936.  C. P. DEBUCH  2,026,775
PROCESS FOR SULPHATING THE NONFERROUS METALS CONTAINED
IN FERRUGINOUS SULPHIDE ORES OR ROASTS
Filed Sept. 5, 1933
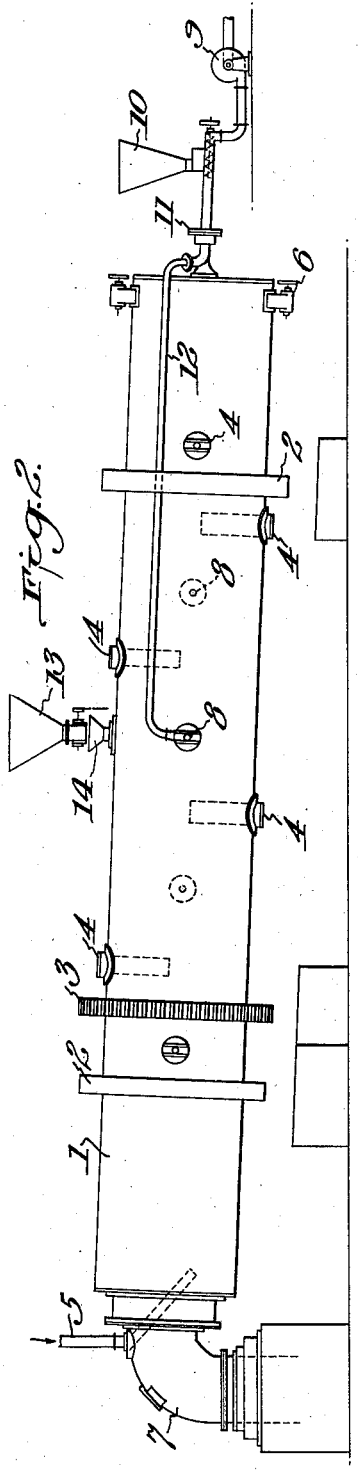
Inventor:
Carl Paul Debuch
By Potter, Pierce & Scheffler
his Attorneys.

Patented Jan. 7, 1936

2,026,775

UNITED STATES PATENT OFFICE 2,026,775

PROCESS FOR SULPHATING THE NON-FERROUS METALS CONTAINED IN FERRUGINOUS SULPHIDE ORES OR ROASTS

Carl Paul Debuch, Frankfort-on-the-Main, Germany, assignor to American Lurgi Corporation, New York, N. Y., a corporation of New York Application September 5, 1933, Serial No. 688,255
In Germany November 14, 1930

11 Claims. (Cl. 75—18)

This invention relates to a process for sulphating the non-ferrous metals contained in mixed sulphide ores or roasts.

It is known to effect the sulphating of zinc sulphide in mixed ores, such as Meggen pyrites, by treating the materials (raw or roasted ores) containing zinc sulphide with a counter-current of gases containing sulphur trioxide at temperatures above the temperature of formation of the iron sulphates and below the decomposition temperature (about 600° C.) of zinc sulphate. It is also known, for the same purpose, to pass raw ore, in the same direction as the gases, first through a high temperature oxidizing zone and then to pass the ore—containing practically oxides alone—through a sulphating zone of lower temperature (about 600° C.) in which second zone sulphur trioxide is formed by contact with the ferric oxide from the first zone, the action of the sulphur trioxide on the oxides of the non-ferrous metals then forming sulphates. In this process it is impossible to obtain gases with a high content of sulphur dioxide, and there is also no possibility of steadily maintaining the optimum temperature in the sulphating stage. Moreover, the requisite dead-roasting of the sulphide ores frequently gives rise to difficulties.

The present invention also relates to a process for sulphating the non-ferrous metals contained in pyrites, mixed ores, or roasts. The process of the present invention differs, however, substantially from those described above. Various methods subordinated to the same inventional idea may be applied according to whether raw or roasted ores are to be treated.

Both methods of carrying out the invention, as applied to raw and roasted ores, respectively, will now be described. In both cases the material that is to be sulphated is passed, in counter-flow to the gases, through a roasting furnace, preferably a mechanical, multi-stage furnace or a rotary-tube furnace, provided, over its length and perimiter with openings for the admission of air.

When a raw ore containing a plurality of sulphides is under treatment, it is found that, during the progress of the ore through the furnace, in the first place all that occurs is that the sulphides in the ore are roasted, and that the active roasting ceases when the major part of the sulphur of the sulphides has been burned off in a first zone. The cessation of the roasting of the sulphides becomes clearly manifest by the drop in the temperature. According to the invention, at the point where the temperature has fallen to the optimum degree for the formation of sulphates, a dusty material is blown in, which burns and maintains the temperature in this portion of the furnace, and the solid combustion product of which serves, at the same time, as a catalyst for converting sulphur dioxide into sulphur trioxide. A typical substance of this kind is flotation pyrites. The introduced pyrites, which burns in the gas space, not only effects the increase in temperature and introduces a contact substance into the furnace, but also affords the additional advantage that the concentration of the sulphur dioxide is increased by the combustion of the pyrites. The introduction of the pyrites accordingly has a threefold effect, consisting in the raising of the temperature, the increase in the concentration of sulphur dioxide and the conversion of the sulphur dioxide into sulphur trioxide by the contact action of the resulting ferric oxide. The sulphur trioxide formed acts on the sulphides of the non-ferrous metals, with formation of sulphates. An important point in the process is the prevalence, in that section of the furnace in which the sulphating proceeds, of a temperature favorable to that operation, that is to say, a temperature which must not substantially exceed 600° C. or fall below 450° C. These conditions can be easily brought about by correspondingly measuring the amounts of pyrites introduced.

Instead of introducing a material which burns in the gas space and furnishes a product which acts as a contact substance, a material such as roasted ore containing ferric oxide, which acts solely as a catalyst, may be introduced. In such case, however, care must be taken to increase the sulphur dioxide concentration, on the one hand, and the heat on the other, in other ways. This can be accomplished, for example, by the simultaneous introduction of hot roasting-furnace gases, alone or in conjunction with a fuel or a substance furnishing sulphur dioxide, or in some other convenient manner.

In treating roasted pyrites, such as Meggen pyrites, or other substances from which the sulphur of iron sulphides has already been eliminated by roasting, or substances containing non-ferrous metals in sulphide form but no great quantity of pyrites, the roasting necessary, in the case of pyritic material, prior to sulphating, is naturally omitted, and the sulphating in accordance with the present invention can be initiated in the vicinity of the charging point of the furnace, almost the whole length of the furnace being then utilized for the sulphating operation.

The process of the present invention has also the particular advantage that the air admitted at the end where the material is discharged is very quickly heated to sulphating temperature, especially when the process is carried out in the known rotary-tube furnace equipped with turning devices. The range of temperature in which the sulphating of the iron is possible is accordingly very quickly passed by the charge, a circumstance also contributing substantially to enable the sulphating to be confined precisely to the non-ferrous metals.

The invention will be illustrated by the following specific example:

Meggen pyrites crushed to a particle size of not more than 10 mm., said pyrites containing 42% to 43% of sulphur and 7% to 8% of zinc, is roasted in a rotary tube furnace which is provided along its length and perimeter with means for introducing fluids, said means including nozzles which protrude into the interior of the furnace for a distance greater than the maximum depth of charge. Air is introduced at a plurality of points along the furnace, at the nozzles above mentioned, as needed at the particular points. The temperature of the roast rises as high as 1000° to 1500° C. relatively quickly. As the content of sulphur is depleted the temperature of the roast decreases, and if that decrease were unchecked would rapidly fall through the sulphating zone to a temperature too low for effective sulphating of the non-ferrous metals. At a point along the furnace which corresponds to the cessation of the more active stage of roasting there is introduced, through one or more of the introducing means above described, pyrites dust, together with those amounts of air necessary to support the combustion of the pyrites dust. The so-introduced pyrites is burned, thereby providing heat for maintaining the temperature of the roast at between 600° and 450° C. through a substantial period of the total treatment. Burning of the pyrites dust in the manner above described effects the production of heat necessary to prolong the sulphating conditions, increases the sulphur dioxide content of the immediate atmosphere of the charge and contributes finely divided iron oxide as the catalyst for expediting the conversion of the sulphur dioxide of that atmosphere to sulphur trioxide. At a temperature within this range and in the presence of the sulphur trioxide the zinc of the ore is converted to zinc sulphate, whereas the iron content of the ore is not converted to iron sulphate due to the fact that iron sulphate is formed at temperatures below 450° C.

It should be explained with reference to the control of the roasting conditions within the furnace that the air nozzles adjacent the charging end of the furnace normally are opened wide, whereas the nozzles remote from the charging end are opened less and less widely as the distance from the charging end increases.

The invention will now be described in greater detail in the following illustrative example and with reference to the accompanying drawing, in which Fig. 1 is a graph illustrating furnace temperatures and sulphur contents of the material in the furnace at each point in the rotary tubular furnace used in carrying out the process, and Fig. 2 is a diagrammatic side elevational view of the rotary tubular furnace organization employed.

In the drawing: 1 is the casing of a rotary tubular furnace provided with a conventional lining (not shown); it is mounted on track rings 2 and is driven by conventional driving means 3. In the furnace casing are provided nozzles 4 through which air for roasting enters the interior of the furnace. Material to be subjected to roasting treatment is introduced within the furnace by means of charging device 5, and material after being subjected to such treatment is discharged therefrom through discharge means 6 at the lower end thereof. 7 represents a gas flue for the taking off of gases from within the furnace. It is noted that the lower end of the furnace is closed. One or more openings 8 are provided along the furnace casing, for introduction of a stream or streams of aeroform ore dust within the furnace. For such introduction there is provided the organization 9, 10, 11, 12 shown, which comprises, respectively, a means 9 for delivering air under pressure, a bunker 10 for ore dust, a manifold head 11, and pipe or pipes 12. Ore dust may also be provided by means of a sluice-like opening or openings 14 on the furnace 1, intermediate the ends thereof, through cooperation between said opening or openings 14 and a bunker 13 by which means ore dust may be fed into the furnace at intervals as, for instance, the sluice-like opening 14 reaches the highest position of its rotation.

With suitable adjustment of the supply of roasting air to the nozzles 4, and with suitable adjustment of the supply of ore dust to the openings 8 and/or 14, the course of the roasting in the furnace is as follows:

After the furnace has been supplied with the material to be treated the oxidation of the sulphur starts vigorously and the main part of the sulphur combined with the iron burns comparatively rapidly. The temperatures in the first half of the furnace follow the curve A—B of Fig. 1. The corresponding curve G—E shows the reduction of sulphur content in the charged material during this time. Toward the end of the pyrites roasting the furnace temperature diminishes. With the ordinary oxidizing roasting it would follow the curve B—D, while at the same time the sulphur content would diminish about as the corresponding curve E—F. According to the present invention, however, when the sulphur content has sunk below point E and in general only the sulphides of the non-ferrous metals are still contained in the material, aeroform streams of pyrites dust are supplied to the furnace, the pyrites dust for the most part burning while still in suspension in the suspending gas. In this way it is possible to maintain the most satisfactory sulphatizing temperatures in the larger part of the furnace, enough pyrites dust being supplied to the furnace to maintain the desired sulphatizing temperature, and due to the catalytic effect of the roasted pyrites dust the sulphides of the non-ferrous metals are converted to sulphates. When the sulphatizing is in general completed, at C, the temperature in the furnace sinks rapidly so that even in this case the material leaves the furnace at comparatively low temperature. A large part of the sulphur that was still contained in the material at the point E is changed to the form of sulphates and the result is that in the finished roasted material practically all the non-ferrous metal is present in the form of sulphates, while considerable amounts of iron have not been changed to sulphate.

I claim:

1. A process for sulphating the non-ferrous metals contained in pyritic ores comprising sulphides of ferrous and non-ferrous metals, which comprises charging the ore into a rotary tubular furnace and causing it to progress therethrough in one direction, subjecting the ore to roasting conditions at an early stage of its passage through the furnace, and maintaining the temperature of the ore at sulphating temperature for a substantial part of its passage while simultaneously introducing into the furnace gases of the sulphating zone a dust of a catalyst for the conversion of sulphur dioxide to sulphur trioxide, the ore and the resulting gases being caused to move through the furnace counter-currently to each other, at least a part of the air admitted into said furnace being introduced thereinto by portions at points intermediate the charging and discharging ends thereof.

2. A process for sulphating the non-ferrous metals contained in pyritic ores comprising sulphides of ferrous and non-ferrous metals, which comprises charging the originating material into a rotary tubular furnace, subjecting the material to roasting conditions at an early stage of its passage through the furnace, and maintaining the temperature of the material at sulphating temperature for a substantial part of its passage through the furnace by introducing pyrites in the form of dust into the furnace gases of the sulphating zone and burning said pyrites in the presence of said roasting material, at least a part of the air admitted into said furnace being introduced thereinto by portions at points intermediate the charging and discharging ends thereof.

3. A process for sulphating the non-ferrous metals contained in roasted pyritic ores, which comprises introducing the ore into a heated rotary tubular furnace and carrying it through the furnace in one direction, and maintaining the temperature of the ore at sulphating temperature for a substantial part of its passage while simultaneously introducing into the furnace gases of the sulphating zone a dust of a catalyst for the conversion of sulphur dioxide to sulphur trioxide, the ore and the resulting gases being caused to move through the furnace counter-currently to each other, at least a part of the air admitted into said furnace being introduced thereinto by portions at points intermediate the charging and discharging ends thereof.

4. A process for sulphating the non-ferrous metals contained in sulphidic form in roasted pyritic ores, which comprises introducing the ore into a heated rotary tubular furnace and carrying it through the furnace in one direction, and maintaining the temperature of the ore at sulphating temperature for a substantial part of its passage while simultaneously introducing into the furnace gases of the sulphating zone a dust of a catalyst for the conversion of sulphur dioxide to sulphur trioxide, the ore and the resulting gases being caused to move through the furnace counter-currently to each other, at least a part of the air admitted into said furnace being introduced thereinto by portions at points intermediate the charging and discharging ends thereof.

5. A process for sulphating the non-ferrous metals contained in pyritic ores comprising sulphides of ferrous and non-ferrous metals, which comprises charging the ore into a rotary tubular furnace and causing it to progress therethrough in one direction, subjecting the ore to roasting conditions at an early stage of its passage through the furnace, under such conditions that sulphides of non-ferrous metals are not roasted down and maintaining the temperature of the ore at sulphating temperature for a substantial part of its passage while simultaneously introducing into the furnace gases of the sulphating zone a dust of a catalyst for the conversion of sulphur dioxide to sulphur trioxide, the ore and the resulting gases being caused to move through the furnace counter-currently to each other, at least a part of the air admitted into said furnace being introduced thereinto by portions at points intermediate the charging and discharging ends thereof.

6. A process for sulphating the non-ferrous metals contained in pyritic ores comprising sulphides of ferrous and non-ferrous metals, which comprises charging the originating material into a rotary tubular furnace, subjecting the material to roasting conditions at an early stage of its passage through the furnace, under such conditions that sulphides of non-ferrous metals are not roasted down and maintaining the temperature of the material at sulphating temperature for a substantial part of its passage through the furnace by introducing pyrites in the form of dust into the furnace gases of the sulphating zone and burning said pyrites in the presence of said roasting material, at least a part of the air admitted into said furnace being introduced thereinto by portions at points intermediate the charging and discharging ends thereof.

7. Process as defined in claim 5, characterized in that a non-sulphidic oxidation catalyst in the form of dust, together with a fuel and a gas containing sulphur dioxide, is introduced into the furnace gases of the sulphating zone for the purpose of maintaining sulphating conditions.

8. Process as defined in claim 5, characterized in that ferric oxide in the form of dust, together with a fuel and a gas containing sulphur dioxide, is introduced into the furnace gases of the sulphating zone for the purpose of maintaining sulphating conditions.

9. Process as defined in claim 5, characterized in that ferric oxide in the form of dust, together with hot sulphur dioxide-containing gas, is introduced into the furnace gases of the sulphating zone for the purpose of maintaining sulphating conditions.

10. A process according to claim 5, characterized in that a substance, in the form of a dust, containing a combustible constituent and a potentially catalytic constituent, is introduced into the furnace atmosphere of the sulphating zone and burns therein whereby its products of combustion yield the catalyst for the conversion of sulphur dioxide to sulphur trioxide.

11. A process according to claim 5, characterized in that pyrites dust is introduced into the furnace atmosphere of the sulphating zone and burns therein whereby its solid products of combustion yield the catalyst for the conversion of sulphur dioxide to sulphur trioxide.

CARL PAUL DEBUCH.